No. 761,802. PATENTED JUNE 7, 1904.
T. T. WELLS.
PLOW ATTACHMENT.
APPLICATION FILED SEPT. 10, 1903.
NO MODEL.
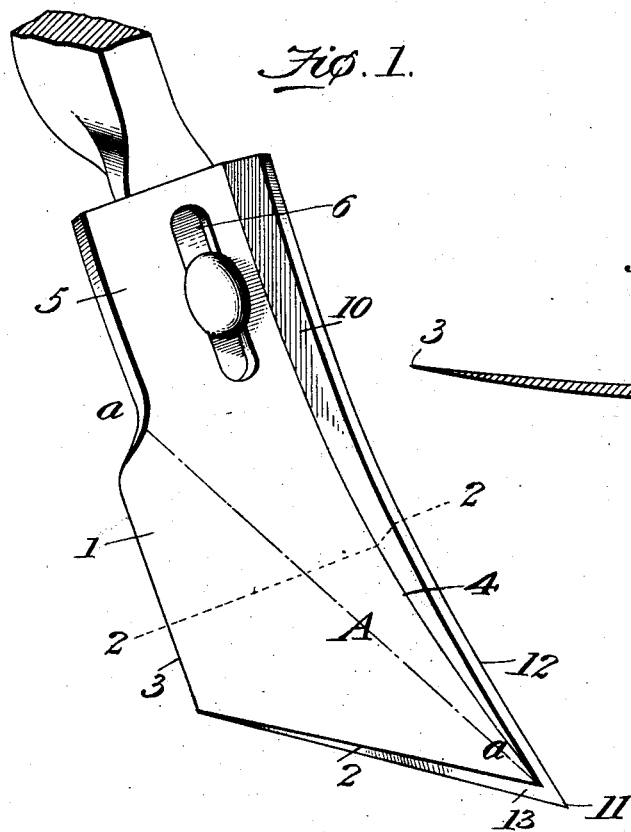
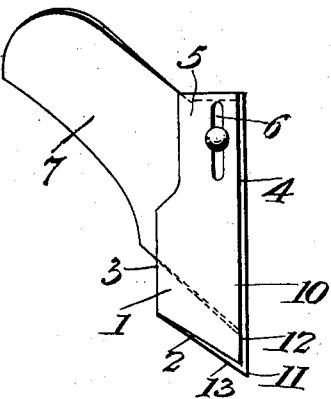
Witnesses
T. T. Wells,
Inventor.
by C. A. Snow & Co.
Attorneys No. 761,802. Patented June 7, 1904.

UNITED STATES PATENT OFFICE.

THOMAS T. WELLS, OF UNION, MISSISSIPPI.

PLOW ATTACHMENT.

SPECIFICATION forming part of Letters Patent No. 761,802, dated June 7, 1904.

Application filed September 10, 1903. Serial No. 172,682. (No model.)

*To all whom it may concern:*

Be it known that I, THOMAS T. WELLS, a citizen of the United States, residing at Union, in the county of Newton and State of Mississippi, have invented a new and useful Plow Attachment, of which the following is a specification.

This invention relates to plow attachments; and it has for its object to provide a plow point or share capable of being used independently by itself or in connection with ordinary moldboards as an attachment whereby the cutting of the soil and turf shall be greatly facilitated, thereby greatly improving the operation of any plow to which it may be attached.

My improved plow attachment is intended and adapted to be made from a single piece, the material preferred being sheet-steel, the blade which constitutes the point as well as the flange which constitutes the cutter being extremely thin and light and yet of sufficient strength to resist all ordinary wear and usage.

My invention then consists in the improved construction of the said plow attachment, which will be hereinafter fully described, and particularly pointed out in the claim.

In the drawings, Figure 1 is a perspective view showing my improved plow attachment. Fig. 2 is a transverse sectional view of the same, taken on the line 2 2 in Fig. 1, enlarged. Fig. 3 is a detail view showing the application of the invention to an ordinary turning-plow.

Corresponding parts in the several figures are indicated by similar numerals of reference.

My improved plow attachment consists of a plate 1, of sheet-steel, cut off diagonally at its lower edge, as indicated at 2, the outer or furrow edge 3 being parallel to the edge 4, which adjoins the land. The upper portion of the plate or blade 1 is reduced to form a shank 5, in which is formed a longitudinal slot 6, adapted to receive the bolt, by means of which it may be secured in position for operation either directly upon the plow-stock or upon an ordinary moldboard 7, as shown in Fig. 3 of the drawings.

At the edge adjacent to the land the blade 1 is provided with an upturned wedge-shaped flange 10, the point of which merges with the extreme point 11 of the blade, said flange extending from thence in an upward direction. The said flange may be of any desired length, but in the drawings hereto annexed it has been shown as extending over the entire length of the blade 1. The flange 10, the width of which gradually increases in an upward direction, is ground to form a sharp cutting edge 12 the full length thereof. The lower edge of the blade is likewise ground, as shown at 13, to form a distinct sharp cutting edge which merges with the cutting edge 12 of the flange in the sharp point 11.

A portion of the body of the blade, which is specially designated A and which is the furrow side of the blade, is hammered out to a very thin and flexible condition, as will be clearly seen in Fig. 2 of the drawings. The portion thus hammered out is clearly indicated by the dotted line $a\,a$ in Fig. 1 of the drawings, and in Fig. 2 it has been clearly shown how this portion of the blade is gradually thinned to a very sharp and knife-like condition. By this specific construction of the blade no strength is practically lost, while at the same time the blade is enabled to flex and adapt itself to the shape of any plow in conjunction with which the device may be used.

When in operation, my improved attachment engages the ground. The surface of the soil or turf will be first engaged by the point 11 of the blade 1 and the flange 10. As the operation progresses the surface of the soil or turf will be engaged by the cutting edge 12 of the flange 10, which latter will also readily cut roots and similar obstacles that may be encountered. It is obvious that the device may be set so as to cut into the soil to any desired depth, so that when used in connection with other plows, as shown in Fig. 3, it may be characterized as a "subsoiler," the slot 6 for the attaching-bolt providing for the necessary adjustment of the device.

My improved plow attachment is not only simple and efficient in use, but it may be manufactured from extremely light material, such as sheet-steel. It is obvious that the usual curve is to be imparted to the blade 1, which constitutes the main blade of the device, and the said blade is obviously strengthened against bending by the upstanding flange 10, which thus, in addition to its functions as a pointer and cutter, performs the office of a brace. While it is true that the body of the blade is thus prevented from bending transversely, owing to the presence of the flange 10, it is also true that the body of the blade 1 is capable of yielding, especially the thin portion of said blade, which is located between the point and the reduced upper portion or shank 5, as indicated in the drawings by dotted lines *a a* in Fig. 1, thus permitting said blade to adapt itself to the curvatures of various plow structures in connection with which it may be used. It is obvious that the upper portion of shank 5 of the blade is likewise yieldable, so that by tightening the connecting-bolt a firm contact between my improved attachment and a subjacent plow-blade may be insured.

Having thus described my invention, I claim—

A plow attachment consisting of a flexible resilient blade having a sharp point and an upturned wedge-shaped flange, the point of which merges with the point of the blade, the furrow side of said blade being drawn to a thin and readily-bendable condition.

In testimony that I claim the foregoing as my own I have hereto affixed my signature in the presence of two witnesses.

THOMAS T. WELLS.

Witnesses:
   R. L. DORNAN,
   R. L. SIMMONS.